Jan. 25, 1966
C. L. CALLUM ETAL
3,231,034
WEIGHT INDICATOR FOR PORTABLE FEED
GRINDING AND MIXING MACHINES
Filed Nov. 22, 1963
2 Sheets-Sheet 1
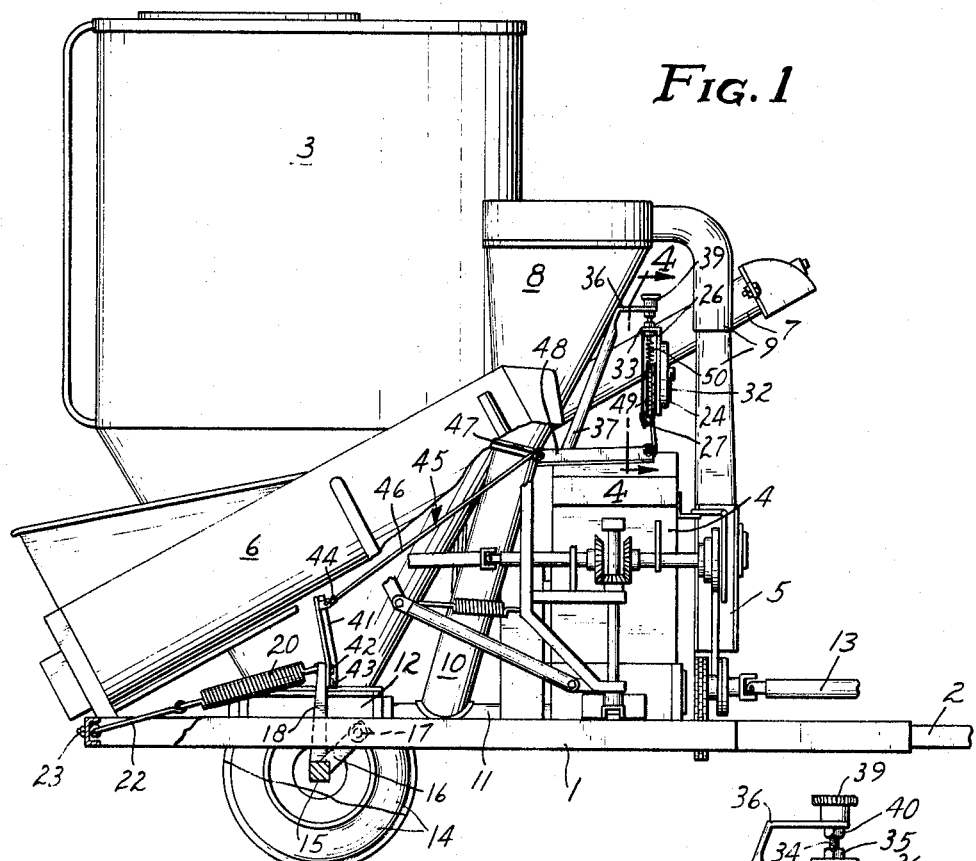
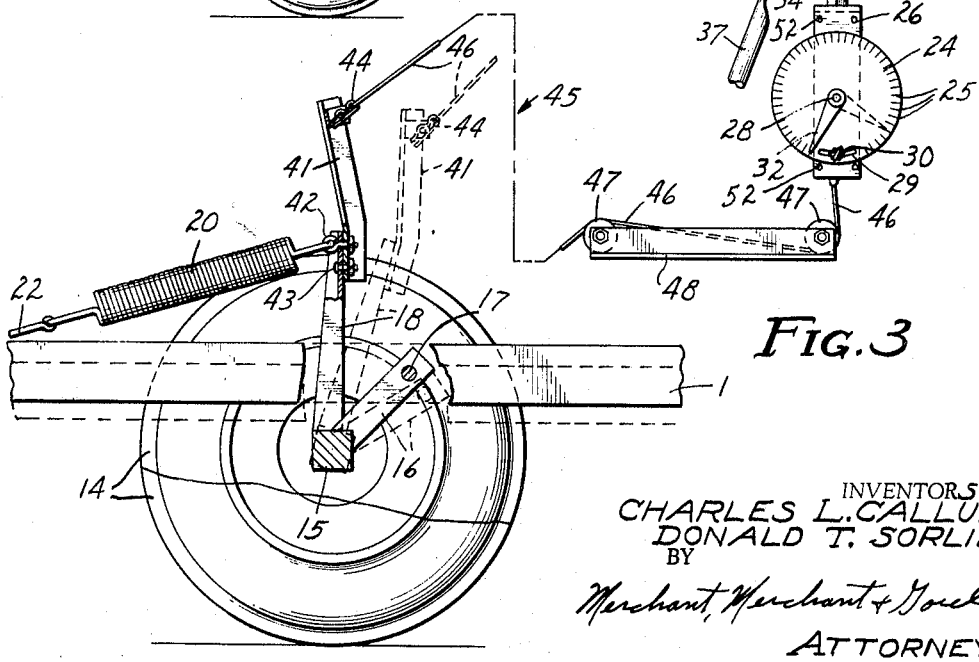
INVENTORS
CHARLES L. CALLUM
DONALD T. SORLIE
BY
Merchant, Merchant & Gould
ATTORNEYS

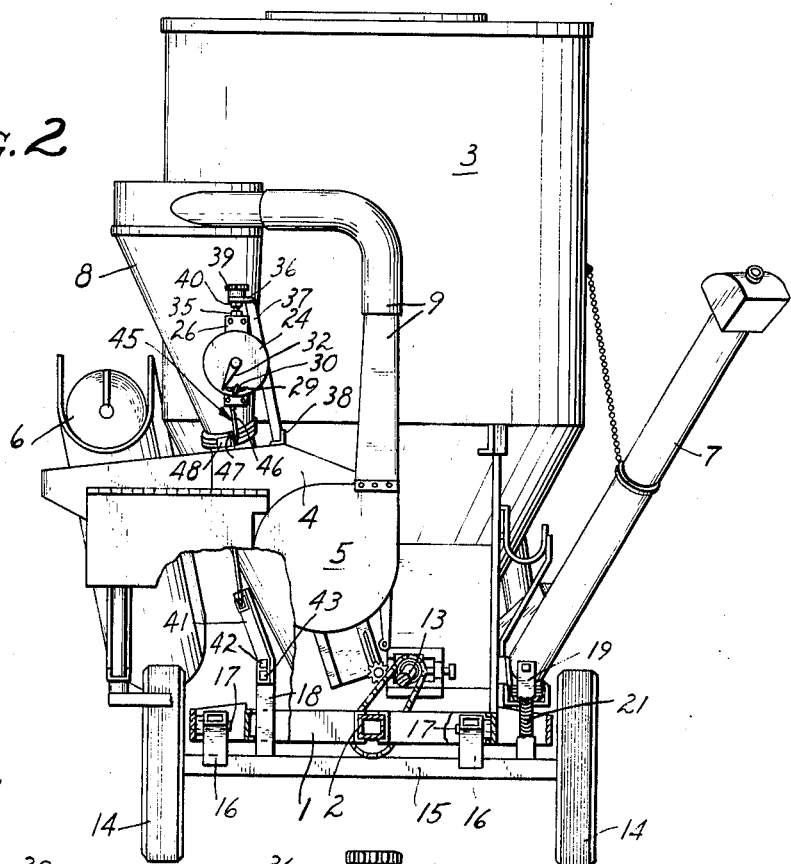
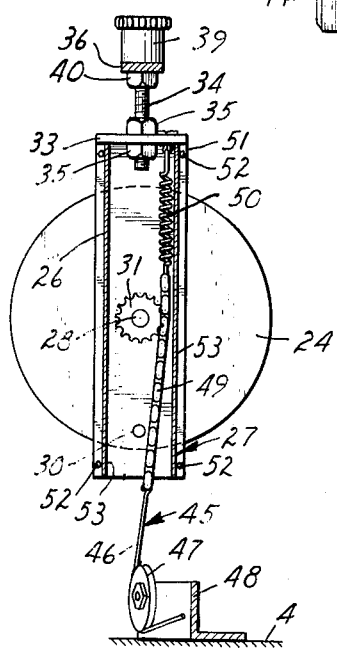
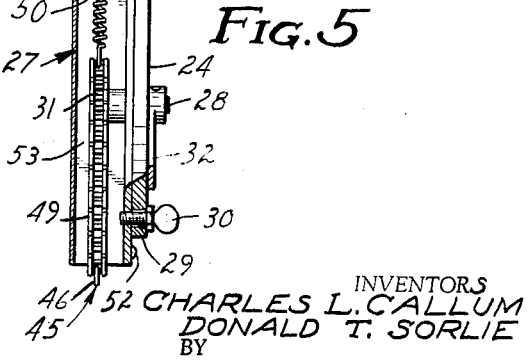

United States Patent Office 3,231,034
Patented Jan. 25, 1966

3,231,034
WEIGHT INDICATOR FOR PORTABLE FEED
GRINDING AND MIXING MACHINES
Charles L. Callum and Donald T. Sorlie, Hopkins, Minn.,
assignors to Daffin Corporation, Hopkins, Minn., a corporation of Delaware
Filed Nov. 22, 1963, Ser. No. 325,596
7 Claims. (Cl. 177—136)

Our invention relates generally to mobile or portable equipment having containers thereon for material to be transported and incorporating scales to indicate the quantity by weight of material in the containers.

More specifically, this invention relates to a scale for measuring the quantity of material in mobile mixing equipment, such as portable animal feed grinding and mixing machines, concrete mixers, and the like.

Heretofore, in mixing a plurality of ingredients in a mobile mixing machine, it has been customary to weigh separately the different ingredients prior to placement of the same in the mixing container; or to place the vehicle on a vehicle weighing scale and add the different ingredients, using the vehicle weighing scale for gaging the desired quantities of the various ingredients. However, particularly in the grinding and mixing of feed materials in relatively small quantities, such as required for a day's or a week's feeding, on a farm, it is usually inconvenient for the operator to weigh out the several ingredients before placing the same in the mixing container, and vehicle weighing scales are seldom, if ever, at a convenient location. Hence, an important object of our invention is the provision of a weighing scale apparatus which can be easily applied to a container equipped vehicle having springs or like cushioning suspension means, and which utilizes said suspension means to operate weight indicating means.

Another object of our invention is the provision of weighing scale apparatus which will clearly and accurately indicate changes in weight of the materials in the container as such materials are added to, or removed from, the container.

Still another object of our invention is the provision of a weighing scale as set forth, which may be quickly and easily adjusted so as to be easily read from different directions relative to the vehicle.

Another object of our invention is the provision of a portable feed grinder and mixer having, a frame, supporting wheels, yielding suspension means between said wheels and frame, and a weight indicator carried by the frame and operatively connected to the suspension means for indicating weight of material carried by the machine.

To the above ends, we provide a scale comprising a graduated scale element and a cooperating weight indicator element, one of which is operatively connected in generally fixed relation to a mixing container and the other of which is connected to a portion of the suspension or supporting means of the vehicle, by means of an elongated flexible member, and movable responsive to movements of the container relative to the supporting wheels of the vehicle.

The above, and still further highly important objects and advantages of our invention, will become apparent from the following detailed specification, appended claims and attached drawings.

Referring to the drawings, which illustrate the invention, and in which like reference characters indicate like parts throughout the several views:

FIG. 1 is a view in side elevation of a commercially available portable feed grinding and mixing machine incorporating our invention, some parts being broken away and some parts being shown in section;

FIG. 2 is a view in front elevation of the machine of FIG. 1, as seen from the right with respect to FIG. 1, some parts being broken away and some parts being shown in section;

FIG. 3 is an enlarged fragmentary view corresponding to a portion of FIG. 1, with some parts being broken away, some parts shown diagrammatically, some parts being shown in section, and the position of the weighing scale of our invention being transposed;

FIG. 4 is an enlarged fragmentary view, partly in section and partly in rear elevation, taken substantially on the line 4—4 of FIG. 1; and FIG. 5 is an enlarged fragmentary view in side elevation of the weighing scale of our invention, some parts being broken away and some parts being shown in section.

Referring with greater detail to the drawings, a conventional and commercially available portable feed grinder and mixer is shown as comprising a generally horizontally disposed frame structure 1 including a tow bar 2 extending forwardly from the front end of the frame structure 1 and which may be assumed to be adapted for connection to the drawbar of a tractor or the like, not shown. The machine further includes a mixing container 3 supported on the rear end portion of the frame structure 1, a feed grinder 4, a blower 5, a screw feed conveyor elevator 6 for delivery of material to be ground to the grinder 4, a discharge conveyor 7 for delivery of mixed feed material from the mixing container 3, and a conventional air-dust separator 8. A conduit 9 extends from the blower 5 to the separator 8, and a second conduit 10 delivers separated out feed material from the separator 8 to a conveyor, not shown but contained in a tubular duct 11 extending from the grinder 4 to the bottom portion 12 of the mixing container 3. Conventional mixing mechanism, not shown, within the container 3, as well as the grinder 4, blower 5, conveyors 6 and 7 and the conveyor mechanism within the duct 11, are preferably driven from the power take-off of the tractor, not shown, by means of a drive shaft 13. It will be appreciated that the feed grinder and mixer shown, and as above briefly described, does not, in and of itself, comprise the instant invention. Hence, in the interest of brevity, further detailed showing and description thereof is omitted.

The frame 1, and parts mounted thereon, are supported by a pair of tire-equipped ground-engaging wheels 14 suitably journalled on opposite ends of a shaft or axle 15 that extends transversely below the frame 1 and which is mounted for generally upward and downward swinging movements to the frame 1 by a pair of rigid trailing arms or the like 16 that are rigidly secured at their lower rear ends to the axle 15 and pivotally secured at their upper front ends to the frame 1 by means of pivot pins or shafts 17. A pair of spaced rigid crank arms 18 and 19 are rigidly secured at their lower ends to the axle 15 and extend upwardly therefrom. The upper ends of the crank arms 18 and 19 are each connected to one end of a respective coil tension spring 20 and 21 that extend rearwardly therefrom. The rear end of the spring 20 is anchored to the rear end of the frame 1 by means of a rigid link 22 and a nut-equipped eye bolt or the like 23, and it may be assumed that the cooperating spring 21 is similarly anchored at its rear end to the frame 1. The springs 20 and 21 counterbalance the weight of the frame 1 and equipment carried thereby, and cushion the frame 1 and said equipment when the machine is moved over rough terrain.

The weight indicating scale of our invention involves a generally circular plate-like scale element 24 having scale markings or graduations 25 thereon, and which is mounted on a generally vertically disposed mounting member 26. The scale element 24 is journalled at its center on a horizontally disposed shaft 28 which in turn is mounted for rotation in the member 26. Adjacent its lower circumferential edge portion, the scale element 24 is provided with an arcuate slot 29 through which extends a thumb screw or the like 30 that is screw threaded into the lower end portions of the mounting member 26 for releasably locking the scale element 24 in desired adjusted positions of rotation on the axis of the shaft 28. A sprocket wheel 31 is mounted fast on the shaft rearwardly of the mounting member 26, and an indicator element in the nature of a pointer or the like 32, is mounted fast on the forward end of the shaft 28 adjacent the scale element 24, for common rotation with the shaft 28 and sprocket wheel 31. At its upper end, the mounting member 26 is formed to provide a generally horizontally disposed flange 33 through which extends a threaded stud or the like 34 having screw threaded thereon a pair of adjustment and lock nuts 35 that engage opposite upper and lower surfaces of the flange 33. The stud 34 extends upwardly through a horizontally disposed upper end portion 36 of a bracket 37 that is rigidly mounted upon a portion of the feed grinding and mixing machine, such as the grinder 4, and as indicated at 38. Preferably, the bracket 37 is secured to the top portion of the grinder 4 by any suitable means, such as by bolts or welding; and it will be appreciated that the bracket 37 may be suitably mounted on any convenient portion of the machine carried by the frame 1. It will be noted that the end portion 36 of the bracket 37 is horizontally disposed, the stud 34 being screw threaded into a knurled thumb nut or the like 39 that rests upon the top surface of the upper end portion 36 of the bracket 37, a lock nut 40 being screw threaded on the stud 34 and engaging the lower surface of the bracket portion 36. By loosening the thumb nut 39, the mounting member 26 and parts carried thereby may be rotated about the axis of the stud 34 to any desired position and locked in place by the thumb nut 39, so that the scale may be viewed from any desired direction relative to the machine.

An extension member 41 extends generally upwardly from the crank arm 18 and is rigidly connected at its lower end to the upper end of the crank arm 18 by a nut-equipped eye bolt or the like 42 to which is connected the front end of the spring 20, and a nut-equipped machine screw or bolt 43. Suitably anchored to the upper end of the extension member 41, as indicated at 44, is one end of an elongated flexible member 45 including a wire cable or the like 46. The cable 46 is entrained over a pair of guide pulleys or the like 47 journalled in opposite end portions of an angle bracket 48 that is rigidly secured to the top portion of the grinder 4, the opposite end of the cable 46 extending upwardly toward the scale element 24. The elongated flexible member 45 further includes a length of link chain having meshing engagement with the sprocket wheel 31, the lower end of the chain 49 being rigidly secured to the upper end of the cable 46. A coil tension spring 50 is connected at its upper end to the horizontally disposed flange 33 of the mounting member 26 as indicated at 51, the lower end of the spring 50 being rigidly secured to the upper end of the link chain 49. See particularly FIGS. 4 and 5. The spring functions to maintain the flexible cable 46 and chain 49 of the elongated flexible element 45 in a taut condition at all times. A cross-sectionally generally U-shaped member 27 is mounted on the back portion of the mounting member 26 by suitable means, such as mounting screws 52, one side wall 53 of the member 27 being disposed closely adjacent the link chain 49 to prevent accidental lateral movement thereof away from meshing engagement with the sprocket wheel 31, see FIG. 4.

Adjustment of the scale mechanism, to achieve a zero reading on the scale element 24 by the pointer 32, may be made by raising or lowering the mounting member 26 on the stud 34, or by loosening the thumb screw 30 and rotating the dial or scale element 24 as desired. With the scale mechanism properly adjusted, and with the mixing container 3 empty, the counterbalancing springs 20 and 21 will cause the frame 1 to be disposed in a somewhat elevated condition as indicated by full lines in FIG. 3. Then, as material to be ground and mixed is delivered to the machine, the added weight thereof will cause the frame 1 to descend toward the dotted line position of FIG. 3, against bias of the tension springs 20 and 21. As the frame 1 and parts carried thereby are lowered relative to the axle 15, the crank arms 18 and 19 and extension member 41 swing forwardly, tending to impart a slackened condition to the flexible cable 46. The tension spring 50 immediately takes up the slack in the cable 46, and in so doing, moves the link chain 49 upwardly, causing rotation to be imparted to the sprocket wheel 31 and shaft 28 in a clockwise direction with respect to FIG. 3, thus moving the pointer 32 toward its dotted line position of FIG. 3. Subsequently, during unloading of the container 3, tension of the counterbalancing springs 20 and 21 causes raising of the frame 1 and movement of the crank arm extension member 41 from its dotted line position of FIG. 3 toward its full line position thereof, and corresponding movement of the cable 46 and chain 49 against bias of the spring 50 to rotate the indicator element or pointer 32 toward a zero reading.

Our invention has been thoroughly tested and found to be completely satisfactory for the accomplishment of the objectives set forth; and, while we have shown and described a commercial embodiment of our weighing scale mechanism, it will be understood that the same is capable of modification without departure from the spirit and scope of the invention, as defined in the claims.

What is claimed is:

1. A weight indicator for vehicles of the type comprising, wheel mounting means, a pair of supporting wheels mounted on said wheel mounting means, a container, and mounting apparatus including yielding means supporting said container on said wheel mounting means for generally vertical movement of said container relative to said wheel mounting means, said weight indicator comprising:
    (a) a graduated scale element,
    (b) an indicator element cooperating with said scale element to indicate the weight of the contents of said container,
    (c) means mounting said scale element in generally fixed relation to said container and comprising a mounting bracket and an adjustable connection between said bracket and said scale element, said adjustable connection mounting said scale element on said bracket for pivotal movement on a generally vertical axis and releasably locking said scale element in desired set positions of said pivotal movement,
    (d) and means for operatively connecting said indicator element to said wheel mounting means for moving said indicator element relative to said scale element in accordance with said generally vertical movements of said container relative to said wheel mounting means.

2. A portable feed mixing machine comprising:
    (a) a frame,
    (b) a mixing container mounted on said frame,
    (c) a wheel-mounted axle extending transversely of said frame,
    (d) a pair of trailing arms connected at one end of each thereof to said axle and each pivotally connected at its other end to said frame for generally vertical movements of said frame and said container relative to said axle,
    (e) crank arm means extending radially outwardly of said axle and operatively connected to said trailing arms for common movements therewith relative to said frame, (f) yielding means connected to said frame and to said crank arm means and urging said frame and container in an upward direction relative to said axle,
(g) and a weight indicator comprising;
  (1) a graduated scale element,
  (2) an indicator element cooperating with said scale element to indicate the weight of the contents of said container,
  (3) means for rigidly mounting one of said elements in generally fixed relation to said frame,
  (4) and connecting means operatively connecting the other of said elements to said crankarm means for movements in accordance generally with said generally vertical movements of said frame and responsive to said movements of the frame to impart corresponding movements to said other of said elements.

3. A portable feed-mixing machine comprising:
(a) a frame,
(b) a mixing container mounted on said frame,
(c) a wheel mounted axle extending transversely of said frame,
(d) a pair of trailing arms connected at one end of each thereof to said axle and each pivotally connected at its other end to said frame for generally vertical movements of said frame and said container relative to said axle,
(e) crank-arm extending radially outwardly of said axle and operatively connected to said trailing arms for common movements therewith relative to said frame,
(f) yielding means connected to said frame and to said crank arm means and urging said frame and container in an upward direction relative to said axle,
(g) and a weight indicator comprising:
  (1) a graduated scale element,
  (2) an indicator element,
  (3) scale element mounting means operatively mounting said scale element on said frame,
  (4) means mounting said indicator element on said scale element mounting means for indicating movements relative to said scale element,
  (5) and means operatively connecting said indicator element to said crank arm means for movements in accordance generally with said generally vertical movements of said frame and responsive to said movements of the frame to impart corresponding movements to said indicator element.

4. The structure defined in claim 3 in which said scale element mounting means comprises:
(a) a bracket operatively rigidly secured to said frame,
(b) a mounting member,
(c) and means for securing said mounting member to said bracket for adjustment relative to said bracket and for releasably locking said mounting member in different adjusted positions relative to said bracket,
(d) said scale element being rigidly secured to said mounting member,
(e) said indicator element being journalled in said mounting member for rotation relative to said scale element.

5. The structure defined in claim 4 in which said means operatively connecting said indicator element to said axle comprises:
(a) an elongated flexible element operatively connected at one end to said axle,
(b) yielding means connecting the other end of said elongated member to said mounting member,
(c) and a rotary member connected to said indicator element for common rotation therewith,
(d) a portion of the elongated member having positive driving engagement with said rotary member.

6. The structure defined in claim 5 in which said rotary member comprises a sprocket wheel, said rotary member engaging portion of said elongated member comprising a link chain having meshing engagement with said sprocket wheel.

7. The structure defined in claim 5 in which said means for securing said mounting member to said bracket comprises a mounting stud extending longitudinally of said elongated member and adjustable relative to said mounting member in a direction longitudinally of said elongated member to adjust the setting of said indicator element circumferentially of said scale element.

References Cited by the Examiner

UNITED STATES PATENTS

| | | | |
|---|---|---|---|
| 256,373 | 4/1882 | Robbins | 177—139 |
| 263,201 | 8/1882 | Norris et al. | 177—139 |
| 418,317 | 12/1889 | Gragg | 177—139 |
| 595,715 | 12/1897 | Kaiser | 177—138 |
| 601,339 | 3/1898 | Freeman | 177—141 |
| 664,715 | 12/1900 | Bernhardt | 177—139 |
| 688,779 | 12/1901 | Harvey | 177—136 |
| 884,459 | 4/1908 | Bricker | 177—140 |
| 2,717,775 | 9/1955 | Jackson | 177—137 |
| 2,970,820 | 2/1961 | Sepich | 259—171 |
| 3,065,808 | 11/1962 | Dodgen | 177—151 |
| 3,109,505 | 11/1963 | Davis et al. | 177—137 |

LEYLAND M. MARTIN, *Primary Examiner.*